(12) United States Patent
Chang

(10) Patent No.: US 6,754,363 B2
(45) Date of Patent: Jun. 22, 2004

(54) STRUCTURE OF DUAL MAGNETIC LOOP TYPE RECEIVER

(75) Inventor: Jui-Cheng Chang, Taichung (TW)

(73) Assignee: Merry Electronics Co., Ltd., Taichung (TW)

(*) Notice: Subject to any disclaimer, the term of this patent is extended or adjusted under 35 U.S.C. 154(b) by 0 days.

(21) Appl. No.: 10/340,596

(22) Filed: Jan. 13, 2003

(65) Prior Publication Data

US 2004/0070547 A1 Apr. 15, 2004

(30) Foreign Application Priority Data

Oct. 11, 2002 (TW) ...................................... 91216503 U

(51) Int. Cl.[7] .............................................. H04R 25/00
(52) U.S. Cl. ........................ 381/401; 381/412; 381/420
(58) Field of Search ................................. 381/396, 398, 381/401, 402, 403, 404, 412, 420, 421, FOR 152, FOR 155, FOR 159

(56) References Cited

U.S. PATENT DOCUMENTS

| | | | | |
|---|---|---|---|---|
| 3,665,124 A | * | 5/1972 | Sotome | 381/401 |
| 5,715,324 A | * | 2/1998 | Tanabe et al. | 381/412 |
| 6,031,925 A | * | 2/2000 | Shteyn | 381/401 |
| 6,269,168 B1 | * | 7/2001 | Tagami | 381/412 |

* cited by examiner

*Primary Examiner*—Hoang V. Nguyen
(74) *Attorney, Agent, or Firm*—Browdy and Neimark, P.L.L.C.

(57) ABSTRACT

A dual magnetic loop type receiver is composed of a yoke molding, a ferrite yoke, an annular magnet, a magnetic pole member, a vibration panel, a ferrite core, and a circular plate. While the receiver is operated, the annular magnet and the ferrite core and the ferrite yoke cause the receiver to produce an inner magnetic loop that interacts with the inner voice coil, and an outer magnetic loop that interacts with the outer voice coil such that the receiver generates vibration and sound.

8 Claims, 4 Drawing Sheets

STRUCTURE OF DUAL MAGNETIC LOOP TYPE RECEIVER

BACKGROUND OF THE INVENTION

1. Field of the Invention

The present invention relates to telecommunication apparatus, and more specifically to a dual magnetic loop type receiver, which uses two magnetic members to produce two magnetic loops in one single yoke and to further provide multiple functions.

2. Description of the Related Art

A regular moving coil receiver 90 (see FIG. 1) has only on simple function. Inputted electric energy causes a sound coil 91 and an annular magnet 92 to produce a coupling effect and to further move a vibration panel 93. When the vibration panel 93 is vibrated, air molecules contacting the vibration panel 93 are excited to produce a variable dense-disperse wave (longitudinal wave). The amount of variation of the dense-disperse wave is the waveform of sound pressure audible to human ears.

However, the receiver 90 can only produce a magnetic loop to convert electric energy into sound energy without any other added functions. Therefore, while used in an electronic telecommunication apparatus, such as a cellular phone, two component parts (a receiver and a vibrator) are required to achieve sound producing and vibration functions. In recent years, it has been the market tendency to make electronic apparatus thinner and smaller and to provide electronic apparatus with user-friendly operating interfaces. When designing the receiver, which is the key components for electronic telecommunication apparatus, factors of high performance, low consumption of power, flat and compact outer appearance, and low cost should be taken into account.

SUMMARY OF THE INVENTION

It is the primary objective of the present invention to provide a dual magnetic loop type receiver, which provides sound producing and vibration functions and requires less installation space. It is the secondary object of the present invention to provide a dual magnetic loop type receiver, which greatly reduces material cost and assembly cost.

To achieve the foregoing objects of the present invention, the dual magnetic loop type receiver includes a yoke molding, a ferrite yoke, an annular magnet, an outer magnetic pole member, a vibration panel, ferrite core, and circular plate. The yoke molding has an axially extending receiving open space. The ferrite yoke is mounted in the receiving open space of the yoke molding, and has a hollow center shaft portion coaxially suspended in the receiving open space of the yoke molding and a bottom open chamber and an outward flange radially outwardly extending from an end of the hollow shaft portion. The annular magnet is mounted in the receiving open space of the yoke molding and is supported on the outward flange of the ferrite yoke. The annular magnet is provided with a center through hole, which receives the hollow shaft portion of the ferrite yoke. The diameter of the center through hole of the annular magnet is greater than the outer diameter of the hollow shaft portion of the ferrite yoke. The outer magnetic pole member is mounted in the receiving open space of the yoke molding and is supported on the annular magnet. The outer magnetic pole member has a center through hole set in coaxial alignment with the center through hole of the annular magnet for the hollow shaft portion passing through. The diameter of the center through hole of the outer magnetic pole member is greater than the outer diameter of the hollow shaft portion of the ferrite yoke. The vibration panel is mounted in the receiving open space of the yoke molding and above the outer magnetic pole member. The vibration panel has a diaphragm suspended in a center thereof and an outer voice coil axially extending from a periphery of the diaphragm and inserted in the center through hole of the outer magnetic pole member and the center through hole of the annular magnet around the hollow shaft portion of the ferrite yoke and spaced apart from the outer magnetic pole member, the annular magnet and the ferrite yoke at a distance. The ferrite core is mounted within the bottom open chamber of the ferrite yoke and has an inner magnetic pole member mounted at a distal end thereof. The circular plate is mounted within the receiving open space of the yoke molding and has a springy annular body portion and an inner voice coil mounted on the annular body portion and imbedded into the bottom open chamber of the ferrite yoke and positioned around the ferrite core and spaced apart from a periphery of the bottom open chamber and a periphery of the ferrite core at a distance. While the receiver is operated, two inner magnetic loops are generated to interact with the aforesaid component parts such that the receiver will generate vibration and sound and other functions.

DETAILED DESCRIPTION OF THE INVENTION

Figure 1:
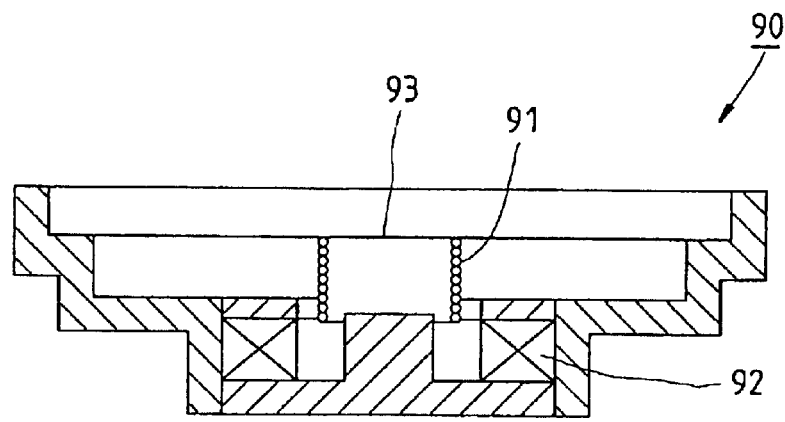
FIG. 1 is a sectional view of a moving coil receiver constructed according to a prior art.
Figure 3:
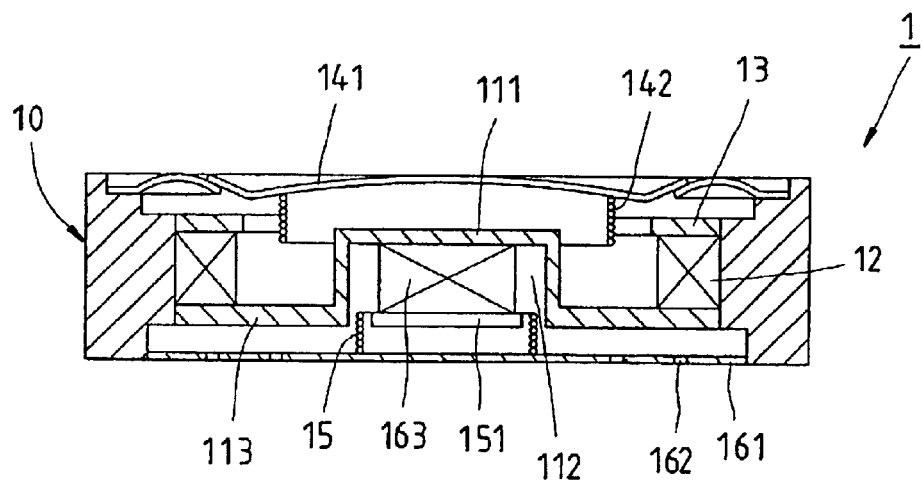
FIG. 3 is a sectional view of the first preferred embodiment of the present invention.
Figure 2:
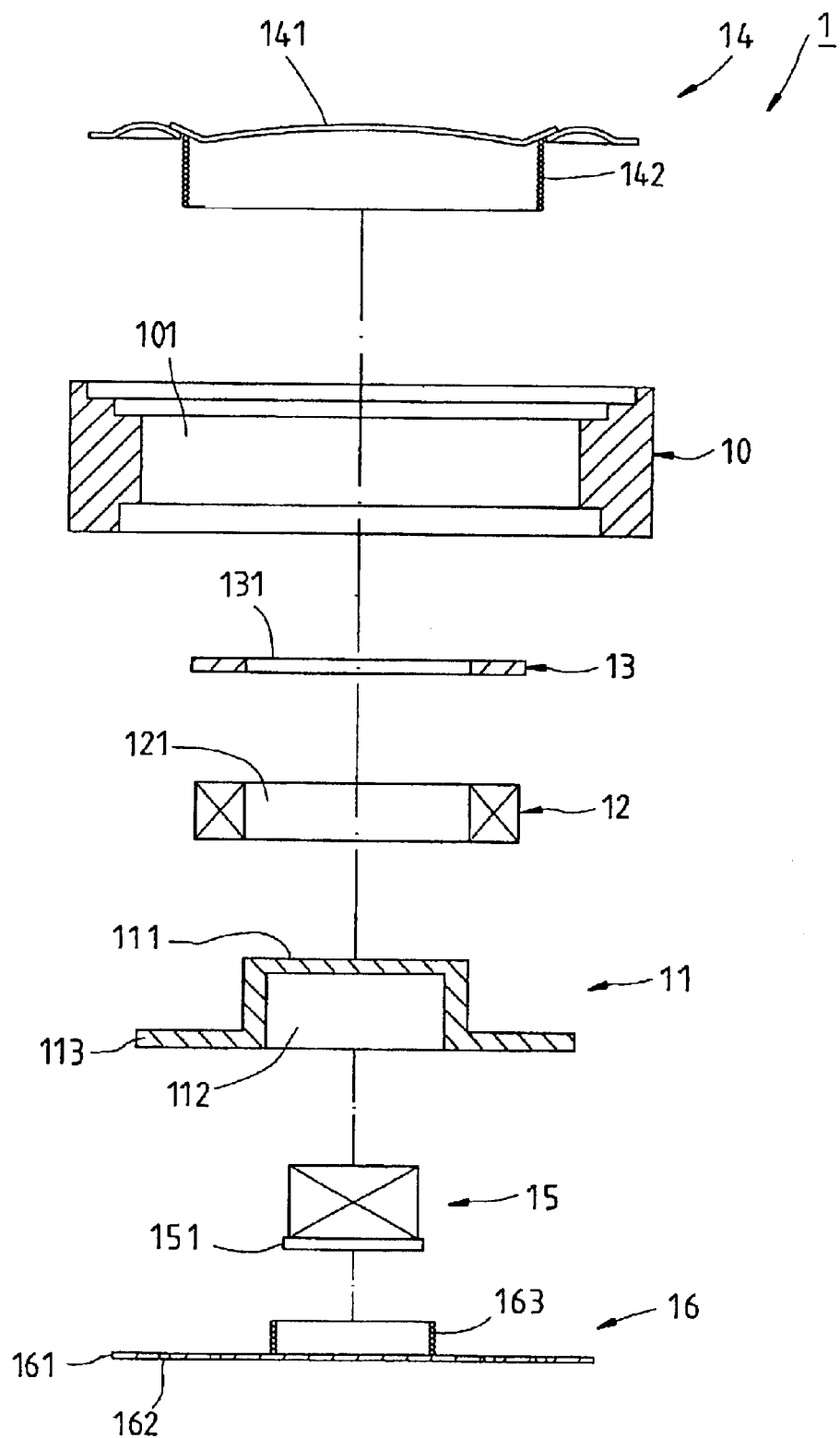
FIG. 2 is an exploded plain view of a first preferred embodiment of the present invention.

Referring to FIGS. 2 and 3, a dual magnetic loop type receiver 1 in accordance with a first preferred embodiment of the present invention is composed of a yoke molding 10, a ferrite yoke 11, an annular magnet 12, an outer magnetic pole member 13, a vibration panel 14, a ferrite core 15, and a circular plate 16.

The yoke molding 10 is shaped like a short cylinder and has an axially extending receiving open space 101.

The ferrite yoke 11 is received in the receiving open space 101 of the yoke molding 10 and has a protruding hollow shaft portion 111 coaxially suspended in the receiving open space 101 of the yoke molding 10 and a bottom open chamber 112 and an outward flange 113 positioned around a periphery of the hollow shaft portion 111.

The annular magnet 12 is press-fitted into the receiving open space 101 of the yoke molding 10 and is supported on the outward flange 113 of the ferrite yoke 11, having a center through hole 121, which receives the hollow shaft portion 111 of the ferrite yoke 11. The diameter of the center through hole 121 of the annular magnet 12 is greater than the outer diameter of the hollow shaft portion 111 of the ferrite yoke 11.

The outer magnetic pole member 13 is press-fitted into the receiving open space 101 of the yoke molding 10 and is supported on the annular magnet 12, having a center through hole 131 set in coaxial alignment with the center through hole 121 of the annular magnet 12 for the hollow shaft portion 111 passing through. The diameter of the center through hole 131 is greater than the outer diameter of the hollow shaft portion 111 of the ferrite yoke 11.

The vibration panel 14 is mounted in the receiving open space 101 of the yoke molding 10 and positioned above the outer magnetic pole member 13, having a diaphragm 141 suspended in a center thereof and an outer voice coil 142 axially extending from a periphery of the diaphragm 141 and inserted through the center, through hole 131 of the outer magnetic pole member 13 and the center through hole 121 of the annular magnet 12 and positioned around the hollow shaft portion 111 of the ferrite yoke 11 and spaced apart from the outer magnetic pole member 13, the annular magnet 12 and the ferrite yoke 11 at a distance.

The ferrite core 15 is mounted within the bottom open chamber 112 of the ferrite yoke 11, having an inner magnetic pole member 15 mounted at a side thereof opposite to the outer magnetic pole member 13.

The circular plate 16 is mounted within the receiving open space 101 of the yoke molding 10 remote from the vibration panel 14, having a springy annular body portion 161, a plurality of arched slots 162 running through the springy annular body portion 161, and an inner voice coil 163 extending from a side around the inner diameter of the springy annular body portion 161 and imbedded into the bottom open chamber 112 of the ferrite yoke 11 and positioned around the ferrite core 15 and spaced from a periphery of the bottom open chamber 112 and a periphery of the ferrite core 15 at a distance.

While the receiver 1 is operated, the annular magnet 12 and the ferrite core 15 cause the receiver 1 to produce an inner magnetic loop that interacts with the inner voice coil 163, and an outer magnetic loop that interacts with the outer voice coil 142. The arched slots 162 of the springy annular body portion 161 of the circular plate 16 reduce the production of eddy current during the interaction of the inner voice coil 163 and outer voice coil 142, lowering the production of resistance. While current signal is inputted into the inner voice coil 163, it couples with the inner magnetic loop to produce a driving energy that passes through the springy annular body portion 161 of the circular plate 16 to produce vibrations. While a current signal is inputted into the outer voice coil 142 at the same time, it couples with the outer magnetic loop to provide a driving energy that drives the diaphragm 141 to vibrate subject to the cycle of the inputted current signal and to further compress air, resulting in the production of sound.

Figure 4:
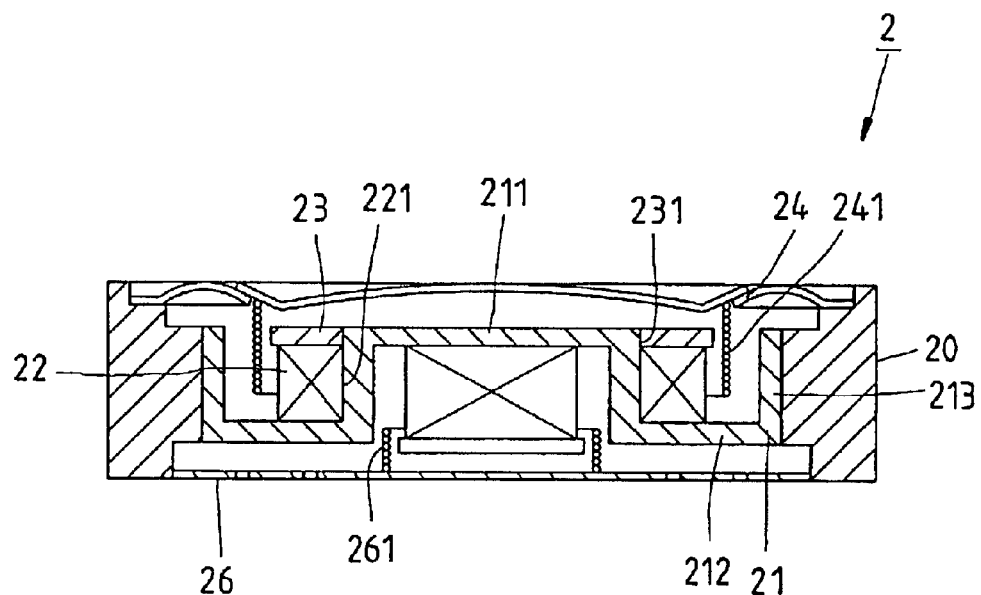
FIG. 4 is a sectional view of a second preferred embodiment of the present invention.

Referring to FIG. 4, the dual magnetic loop type receiver 2 of a second preferred embodiment of the present invention is composed of a yoke molding 20, a ferrite yoke 21, an annular magnet 22, an outer magnetic pole member 23, a vibration panel 24 with an outer voice coil 241, a ferrite core 25, and a circular plate 26 with an inner voice coil 261. The relative positioning and functional designs of the component parts of this second embodiment are substantially the same as the aforesaid first preferred embodiment with the exception of the following minor differences. According to this embodiment, the ferrite yoke 21 has a cylindrical flange 213 perpendicularly extending from a periphery of the outward flange 212 toward the vibration panel 24. The diameters of the center through hole 221 of the annular magnet 22 and the center through hole 231 of the outer magnetic pole member 23 are respectively slightly greater than the outer diameter of the hollow shaft portion 211 of the ferrite yoke 21. The outer diameters of the annular magnet 22 and the outer magnetic pole member 23 are respectively smaller than the inner diameter of the cylindrical flange 213 of the ferrite yoke 21. Accordingly, the annular magnet 22 and the outer magnetic pole member 23 are respectively press-fitted onto the hollow shaft portion 211 of the ferrite yoke 21. The outer voice coil 241 of the vibration panel 24 is suspended around the outer magnetic pole member 23 and the annular magnet 22 and positioned among the outer magnetic pole member 23, the annular magnet 22, and the cylindrical flange 213 of the ferrite yoke 21. By means of the aforesaid arrangement, the receiver 2 produces two magnetic loops while operated, achieving vibration and sound producing functions.

Figure 5:
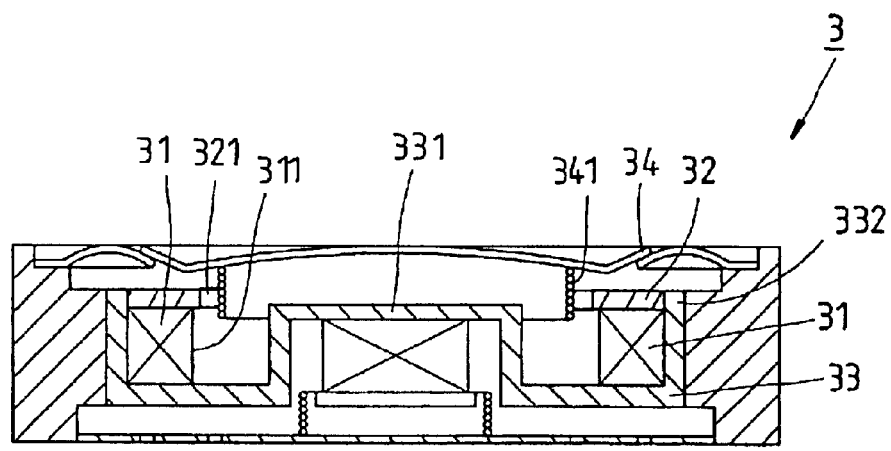
FIG. 5 is a sectional view of a third preferred embodiment of the present invention.

Referring to FIG. 5, the dual magnetic loop type receiver 3 of a third preferred embodiment of the present invention is substantially the same as the receiver 2 in the aforesaid second embodiment with the exception of the following minor differences. According to this embodiment, the diameter of the center through hole 311 of the annular magnet 31 and the diameter of the center through hole 321 of the outer magnetic pole member 32 are respectively greater than the outer diameter of the hollow shaft portion 331 of the ferrite yoke 33. The annular magnet 31 and the outer magnetic pole member 32 are respectively press-fitted into the cylindrical flange 332 of the ferrite yoke 33. The outer voice coil 341 of the vibration panel 34 is inserted into the center through hole 321 of the outer magnetic pole member 32 and the center through hole 311 of the annular magnet 31 positioned around the hollow shaft portion 331 of the ferrite yoke 33. By means of the aforesaid arrangement, the receiver 3 produces two magnetic loops while operated, achieving vibration and sound producing functions.

Figure 6:
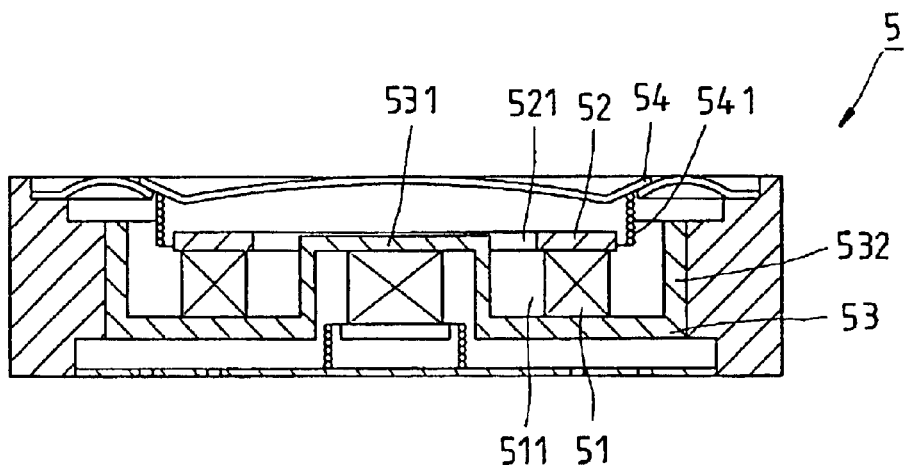
FIG. 6 is a sectional view of a fourth preferred embodiment of the present invention.

Referring to FIG. 6, accordingly to a dual magnetic loop type receiver 5 of a fourth embodiment of the present invention, the diameter of the center through hole 511 of the annular magnet 51 and the diameter of the center through hole 521 of the outer magnetic pole member 52 are respectively slightly greater than the outer diameter of the hollow shaft portion 531 of the ferrite yoke 53. The outer diameter of the annular magnet 51 and the outer diameter of the outer magnetic pole member 52 are respectively smaller than the inner diameter of the cylindrical flange 532 of the ferrite yoke 53 such that the annular magnet 51 and the outer magnetic pole member 52 are respectively spaced apart from the hollow shaft portion 531 and the cylindrical flange 532. The outer voice coil 541 of the vibration panel 54 is suspended around the outer magnetic pole member 52 and the annular magnet 51 and positioned among the outer magnetic pole member 52, the annular magnet 51, and the cylindrical flange 532 of the ferrite yoke 53. By means of the aforesaid arrangement, the receiver 5 produces two magnetic loops while operated, achieving vibration and sound producing functions.

Figure 7:
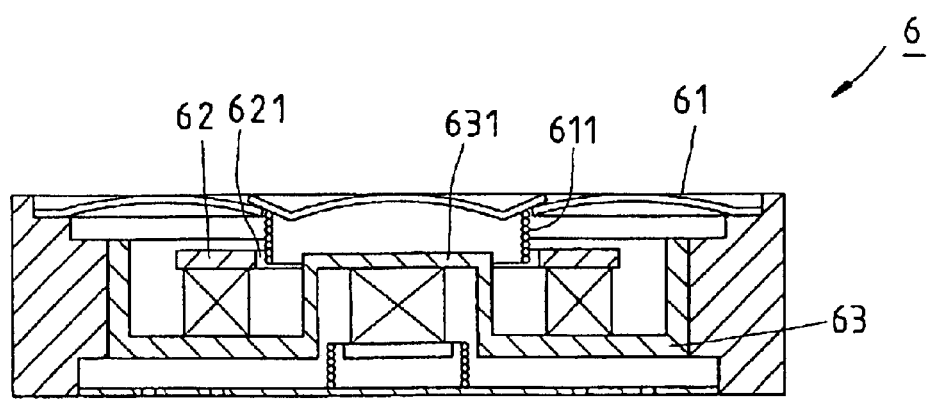
FIG. 7 is a sectional view of a fifth preferred embodiment of the present invention.

Referring to FIG. 7, according to the receiver 6 of a fifth preferred embodiment of the present invention, the outer voice coil 611 of the vibration panel 61 is inserted into the center through hole 621 of the outer magnetic pole member 62 and is positioned between the center through hole 621 and the hollow shaft portion 631 of the ferrite yoke 63. By means of the aforesaid arrangement, the receiver 6 produces two magnetic loops while operated, achieving vibration and sound producing functions.

As indicated above, the present invention has the following advantages:

1. The dual magnetic loop type receiver combines two parts (the receiver and a vibrator) of a cellular phone into an integrated device so as to reduce cellular phone internal installation space and to improve the cellular phone working efficiency and to reduce waste of resources.

2. The invention meets the electronic telecommunication apparatus's current focus, which is characterized in being thinner, smaller, and shorter, and greatly reducing material cost and assembly cost.

3. While used in a cellular phone, the present invention provides voice amplifying and caller ringing functions without producing increased magnetic waves that are harmful to human beings and traffic security.

4. Because the dual magnetic loop type receiver uses two magnetic members to produce two magnetic loops, the voice frequency response, responding area, and responding sensitivity of the dual magnetic loop type receiver are superior to a conventional receiver that uses one single magnetic member to produce two magnetic loops.

What is claimed is:

1. A dual magnetic loop type receiver comprising:

a yoke molding having an axially extending receiving open space;

a ferrite yoke mounted in the receiving open space of said yoke molding and having a hollow center shaft portion coaxially extending into the receiving open space and a bottom open chamber and an outward flange positioned at a periphery of said hollow shaft portion;

an annular magnet mounted in the receiving open space of said yoke molding and coaxially having a center through hole, the diameter of the center through hole of said annular magnet being greater than the outer diameter of said hollow shaft portion of said ferrite yoke such that the annular magnet is fitted onto said hollow shaft portion and positioned on said outward flange;

an outer magnetic pole member mounted in the receiving open space of said yoke molding and positioned on said annular magnet and having a center through hole set in coaxial alignment with the center through hole of said annular magnet for the hollow shaft portion passing through, the diameter of the center through hole of said outer magnetic pole member being greater than the outer diameter of the hollow shaft portion of said ferrite yoke;

a vibration panel mounted at an end of the receiving open space of said yoke molding and positioned above said outer magnetic pole member and having a diaphragm suspended in the center thereof and an outer voice coil axially extending from a periphery of said diaphragm and inserted in the center through hole of said outer magnetic pole member and the center through hole of said annular magnet around the hollow shaft portion of said ferrite yoke and spaced apart from said outer magnetic pole member, said annular magnet and said ferrite yoke at a distance;

a ferrite core mounted within the bottom open chamber of said ferrite yoke, said ferrite core having a distal end fixedly mounted with an inner magnetic pole member; and a circular plate mounted in the receiving open space of said yoke molding remote from said vibration panel and having a springy annular body portion and an inner voice coil extending from a side thereof and inserted into the bottom open chamber of said ferrite yoke around said ferrite core and spaced apart from a periphery of said bottom open chamber and a periphery of said ferrite core at a distance;

whereby, when the receiver operated, said annular magnet and said ferrite core and said ferrite yoke cause the receiver to produce an inner magnetic loop that interacts with said inner voice coil and an outer magnetic loop that interacts with said outer voice coil.

2. The dual magnetic loop type receiver as defined in claim 1, wherein the diameter of the center through hole of said annular magnet and the diameter of the center through hole of said outer magnetic pole member are respectively greater than the outer diameter of the hollow shaft portion of said ferrite yoke, and said annular magnet and said outer magnetic pole member are respectively press-fitted into the receiving open space of said yoke molding, whereby said outer voice coil of said vibration panel is positioned between said annular magnet and said outer magnetic pole member and around the hollow shaft portion of said ferrite yoke.

3. The dual magnetic loop type receiver as defined in claim 1, wherein said ferrite yoke comprises a cylindrical flange perpendicularly extending from a periphery of the outward flange thereof toward said vibration panel.

4. The dual magnetic loop type receiver as defined in claim 3, wherein the diameter of the center through hole of said annular magnet and the diameter of the center through hole of said outer magnetic pole member are respectively greater than the outer diameter of the hollow shaft portion of said ferrite yoke and the outer diameter of said annular magnet, and the outer diameter of said outer magnetic pole member are respectively smaller than the inner diameter of the cylindrical flange of said ferrite yoke such that said annular magnet and said outer magnetic pole member are respectively press-fitted onto the hollow shaft portion of said ferrite yoke, whereby said outer voice coil of said vibration panel is suspended around said outer magnetic pole member, said annular magnet, and the cylindrical flange of said ferrite yoke.

5. The dual magnetic loop type receiver as defined in claim 3, wherein the diameter of the center through hole of said annular magnet and the diameter of the center through hole of said outer magnetic pole member are respectively greater than the outer diameter of the hollow shaft portion of said ferrite yoke, and said annular magnet and said outer magnetic pole member are respectively press-fitted into the cylindrical flange of said ferrite yoke, whereby said outer voice coil is suspended in the center through hole of said outer magnetic pole member and the center through hole of said annular magnet and around the hollow shaft portion of said ferrite yoke.

6. The dual magnetic loop type receiver as claimed in claim 3 wherein the diameter of the center through hole of said annular magnet and the diameter of the center through hole of said outer magnetic pole member are respectively greater than the outer diameter of the hollow shaft portion of said ferrite yoke, and the outer diameter of said annular magnet and the outer diameter of said outer magnetic pole member are respectively smaller than the inner diameter of the cylindrical flange of said ferrite yoke such that a gap exists between the outer diameter of said annular magnet and said outer magnetic pole member and the inner diameter of the cylindrical flange of said ferrite yoke, for enabling said outer voice coil to be suspended around said outer magnetic pole member and said annular magnet within the cylindrical flange of said ferrite yoke.

7. The dual magnetic loop type receiver as defined in claim 3, wherein the diameter of the center through hole of said annular magnet and the diameter of the center through hole of said outer magnetic pole member are respectively greater than the outer diameter of the hollow shaft portion of said ferrite yoke, and the outer diameter of said annular magnet and the outer diameter of said outer magnetic pole member are respectively smaller than the inner diameter of the cylindrical flange of said ferrite yoke such that a gap exists between the outer diameter of said annular magnet and said outer magnetic pole member and the inner diameter of the cylindrical flange of said ferrite yoke, for enabling said outer voice coil to be inserted into the center through hole of said outer magnetic pole member and to be suspended around the hollow shaft portion of said ferrite yoke.

8. The dual magnetic loop type receiver as defined in claim 1, wherein said circular plate has a plurality of arched slots running through said springy annular body portion thereof for reducing the production of eddy current during interaction of said outer voice coil and said inner voice coil.

* * * * *